US012803218B2

(12) United States Patent
Pailot

(10) Patent No.: US 12,803,218 B2
(45) Date of Patent: Nov. 17, 2026

(54) CIRCULAR CONNECTOR OF THE PLUG TYPE FOR A CONNECTION ASSEMBLY WITH A COMPLEMENTARY CIRCULAR CONNECTOR, OF THE RECEPTACLE TYPE, COMPRISING AN ERGONOMIC COUPLING AND/OR LOCKING DEVICE

(71) Applicant: RADIALL SA, Aubervilliers (FR)

(72) Inventor: Nicolas Pailot, Monts (FR)

(73) Assignee: RADIALL SA, Aubervilliers (FR)

(*) Notice: Subject to any disclaimer, the term of this patent is extended or adjusted under 35 U.S.C. 154(b) by 332 days.

(21) Appl. No.: 18/428,258

(22) Filed: Jan. 31, 2024

(65) Prior Publication Data

US 2024/0313471 A1 Sep. 19, 2024

(30) Foreign Application Priority Data

Feb. 3, 2023 (FR) ...................................... 2301044

(51) Int. Cl.
*H01R 13/625* (2006.01)

(52) U.S. Cl.
CPC .................................. *H01R 13/625* (2013.01)

(58) Field of Classification Search
CPC .. H01R 13/625; H01R 13/629; H01R 13/633; H01R 43/26
USPC ................................................. 439/314, 317
See application file for complete search history.

(56) References Cited

U.S. PATENT DOCUMENTS

| | | | | |
|---|---|---|---|---|
| 5,427,542 | A * | 6/1995 | Gerow | H01R 13/633 439/314 |
| 7,181,999 | B1 * | 2/2007 | Skeels | H01R 43/26 81/124.2 |
| 8,944,837 | B2 * | 2/2015 | Huang | B25B 13/065 439/314 |
| 10,666,007 | B2 * | 5/2020 | Berkenbush | B25B 13/5016 |
| 2009/0163066 | A1 * | 6/2009 | Vanzo | H01R 13/625 439/314 |
| 2014/0141638 | A1 | 5/2014 | Huang | |
| 2018/0131129 | A1 * | 5/2018 | Plested | H01R 43/26 |
| 2019/0020165 | A1 | 1/2019 | Berkenbush et al. | |
| 2019/0027860 | A1 * | 1/2019 | Peters | F16D 1/108 |
| 2021/0184400 | A1 | 6/2021 | Krome | |

FOREIGN PATENT DOCUMENTS

CN 113300161 B * 9/2022 ........... H01R 13/629

OTHER PUBLICATIONS

International Search Report dated Dec. 6, 2023.

* cited by examiner

*Primary Examiner* — Gary F Paumen
(74) *Attorney, Agent, or Firm* — IPSILON USA, LLP

(57) ABSTRACT

The invention consists substantially of implanting in a cover (5), around a ring (4) for locking a plug (3) on a receptacle (2) of a connection assembly (1), a torque transmission device (6, 60, 42, 7), which is preferably configured as a multiplier in order to de-multiply the forces of the tool on the ring which, by means of a movement of rotation in one direction, from an axis which is offset relative to the central axis, carries out the coupling and/or the locking of the plug on the receptacle.

16 Claims, 22 Drawing Sheets

CIRCULAR CONNECTOR OF THE PLUG TYPE FOR A CONNECTION ASSEMBLY WITH A COMPLEMENTARY CIRCULAR CONNECTOR, OF THE RECEPTACLE TYPE, COMPRISING AN ERGONOMIC COUPLING AND/OR LOCKING DEVICE

RELATED APPLICATION

This application claims the benefit of priority from French Patent Application No. 23 01044, filed on Feb. 3, 2023, the entirety of which is incorporated by reference.

TECHNICAL FIELD

The present invention concerns the field of circular connectors, with electrical and/or optical contacts.

More particularly, it concerns solutions for coupling/uncoupling and locking/unlocking of a connection assembly with complementary circular connectors.

The main objective of the invention is to improve the device for locking between complementary circular connectors, of the plug and receptacle type, of a connection assembly.

The applications to which the invention relates in particular are so-called multi-contact electrical connection assemblies which can receive a plurality of independent contacts or connection modules of contacts, or modules of contacts, which are typically electrical and/optical according to the electrical and/optical connection to be produced. More specifically, but not only, a strong current and/or a high level of electrical power can be transmitted by this type of system.

The invention also concerns in general connection assemblies in outdoor applications, in particular for railways and travelling vehicles, and for aeronautical or military or robotic applications.

Although described with reference to an application in the aeronautical field for circular connectors of the series MIL-DTL-38999, the invention can be applied in other fields such as railways, industrial or military, medical, or also telecommunications fields, in particular in hostile environments. In particular, the invention can be applied to the circular connectors in the aeronautical field in conformity with the standard MIL-DTL-38999, EN2997, EN3645, EN3646, and also to the direct optical adapters or also to the connectors of the railway field in conformity with the standard EN50467.

Also, although described with reference to a bayonet locking device, the invention can be applied to other types of devices, in particular of the screw-nut type.

Within the context of the invention, "circular" means an element (connector, housing, ring, cover, envelope) with a generally cylindrical form, with at least one inner or outer portion with a circular transverse cross-section.

PRIOR ART

In numerous connection applications, it is known to lock a connector together with the complementary connector of the same assembly, once their connection configuration has been created, i.e. when the coupling between their respective contacts has been assured.

This is particularly necessary when the environment in which the connection assembly is present is subject to significant environmental stresses, usually known by the expression "hostile environment", as can be the case for aircraft, and in particular when the assembly is fitted on a panel of on-board or structural equipment.

For example, circular connectors of the series of the type MIL-DTL 38999, which are used in particular in a hostile environment (in particular the engine, the wings) of an aircraft, must be locked together.

Although the different known locking systems have proved to be efficient and reliable, the inventors have come to the conclusion that they could not overcome a problem with which they have recently been faced.

In fact, in a given application, which in particular is aeronautical, the available space which can be allocated to fit a plurality of connection assemblies on a panel can be very limited.

In order to illustrate this space constraint, FIG. 1 illustrates a circular connector with a type of receptacle 2 of a multi-contact connection assembly according to an existing series of the type MIL-DTL 38999.

This receptacle 2 comprises a plate 20, for securing, in particular by screwing, on a panel P, in particular of an aircraft, a housing 21, generally formed integrally with the plate 20, accommodating an insert 22 in which a plurality of electrical contacts 23 are fitted (eight of them in the example illustrated).

FIG. 1 also shows a plug 3 comprising a housing 31.

A locking ring 4 is fitted such as to be free in rotation around the housing 31 of the plug 3.

Once the plug 3 has been coupled mechanically to the complementary receptacle 2, i.e. with their respective electrical contacts coupled, an operator turns the locking ring 4 manually, so that it carries out the locking, in particular by means of a device of the bayonet type, between the housing 21 and the complementary housing of the plug 31.

This operation therefore requires the operator to have sufficient access around the receptacle to place one of his hands, and guarantee gripping of the ring in order to carry out the required rotation.

However, in certain applications where space is crucial, it is required increasingly to densify the connection assembly fittings, i.e. to secure a maximum number of adjacent receptacles on a single panel.

This densification can reach a point where the space sufficient for access by an operator's hand is no longer guaranteed, or is at a strict minimum, which is very uncomfortable for the operator, or makes the locking operation time-consuming or impossible. A minimum access area is symbolised by the circular hatched area Z in FIG. 1.

By way of example, for a receptacle 2 of the series of type MIL-DTL 38999 with a size of 17 to 55 contacts, the required surface area by contact is approximately 53 $mm^2$.

Then, the torque and the rotation course applied manually by the operator must be sufficient to guarantee satisfactory locking between the plug and the receptacle, and thus guarantee the electrical continuity between the two housings, which can be problematic to carry out manually, and/or imperfect in the case of an access area which is reduced to the minimum.

There is therefore a need to improve further the coupling and locking to one another between complementary circular connectors, in particular in order to have the possibility of easy locking in an environment with a constraint of available space, and/or which requires the application of a substantial locking force.

The objective of the invention is to fulfil this need completely or partly.

SUMMARY OF THE INVENTION

For this purpose, according to one of its aspects, the subject of the invention is a connection assembly with a longitudinal axis, comprising:

- a first circular connector forming a receptacle, which in particular is designed to be secured to an electronic or structural equipment panel, and a second circular connector forming a plug, with the receptacle and the plug each comprising a housing;
- a device for coupling and/or locking of the plug and the receptacle in their mutual configuration of coupling, corresponding to a connection, comprising:
  - a circular coupling and/or locking ring, fitted such as to be free in rotation around one out of the housing of the plug and the housing of the receptacle;
  - at least one coupling and locking means arranged on the periphery of the locking ring, the said means being designed to cooperate with a complementary coupling and locking means arranged on the periphery of one out of the housing of the receptacle and the housing of the plug, such that rotation according to an angular course of the ring makes it possible to couple the plug in the receptacle by translation along the longitudinal axis, then to lock them mechanically when they are coupled to one another;
- a mechanical transmission device comprising:
  - a support which is secured on, or is produced integrally with, one out of the housing of the plug and the housing of the receptacle, comprising an inner seat which extends along an axis which is co-linear with, and distinct from, the longitudinal axis;
  - a receipt unit which is secured on, or is produced integrally with, the outer periphery of the ring;
  - a drive unit, which is fitted such as to rotate detachably or permanently in the inner seat of the support, the drive unit being designed to be rotated by a tool, in order to transmit its rotation to the receipt unit and thereby to the ring.

According to an advantageous embodiment, the mechanical transmission device comprises:

- a circular cover which is fitted around the locking ring, and is secured on one out of the housing of the plug and the housing of the receptacle;
- as a support, a hollow envelope which is secured on, or produced integrally with, the cover, delimiting the inner seat.

According to an advantageous configuration, the ring is fitted around the housing of the plug.

According to an advantageous embodiment, the de-multiplication ratio, i.e. of the speeds of rotation, between the receipt unit and the drive unit, is less than 1, such that the transmission device increases the rotation torque applied by the drive unit to the ring.

According to an advantageous variant embodiment, the mechanical transmission device comprises a gear train, including, as a drive unit, at least one cylindrical gear which is fitted such as to rotate, detachably, or permanently, in the inner seat of the envelope, and as a receipt unit, a circular engagement portion which is secured on, or is produced integrally with, at least part of the outer periphery of the ring.

The cylindrical gear can constitute the free end of the tool to be inserted detachably in the inner seat, and preferably while being in direct engagement contact with the circular engagement portion.

Alternatively, the cylindrical gear can be fitted such as to rotate permanently in the inner seat, preferably while being in direct engagement contact with the circular engagement portion.

The cylindrical gear and the circular engagement portion can have straight or helical toothing.

According to an advantageous embodiment, the coupling and/or locking device is of the bayonet type, and comprises:

- at least one coupling and locking ramp arranged on the outer periphery of the housing of one out of the receptacle and the plug;
- at least one coupling and locking lug, arranged on the inner periphery of the ring, and designed to engage in the said at least one ramp, and slide therein from a pre-coupling position reached by relative translation between the plug and the receptacle without action by the tool, to a coupling position, in which the plug and the receptacle are coupled to one another by means of rotation of the drive unit by the tool, and a locking position in the continuity of the coupling position, obtained by additional rotation, wherein the coupled plug and the receptacle are locked mechanically.

Advantageously, the lug comprises a roller which is designed to slide with rotation around itself in the ramp. This therefore reduces the friction of the lug when it slides in the ramp.

According to the bayonet embodiment, the assembly preferably comprises a resilient return element to rotate the ring automatically once the lug is engaged in the ramp, and bring the lug into the pre-coupling position, in which the lug cannot be released without the action of the tool.

Advantageously, the resilient return element is also put under increasing tension by the rotation of the drive unit from the pre-coupling position of the lug, to its coupling position and its locking position, such that inverse rotation of the drive unit by the tool returns the lug from its locking position to its coupling position, which unlocks the plug from the receptacle, with the relaxation of the resilient return element returning the lug automatically to a pre-coupling or disengaged position of the ramp, which uncouples the plug from the receptacle. Thus, the return element permits automatic uncoupling without force to be applied by an operator.

According to an advantageous construction, the resilient return element is a torsion spring which is arranged in the inner seat, with one of its free ends retained therein, and the other one of its free ends retained in the cylindrical gear.

According to another variant embodiment, the coupling and/or locking device is of the screw type, with the ring comprising an inner thread which is designed to be screwed around an outer thread of the housing of the receptacle or the plug.

According to an advantageous construction mode, the assembly comprises at least one compression spring, preferably in the form of washers, which is arranged between one out of the housing of the plug and the housing of the receptacle and the ring, in order to apply pressure of the housing of the plug against the housing of the receptacle, or vice versa, when they are coupled and/or locked together.

According to another advantageous construction mode, the cover comprises a window which opens out, which, during the rotation of the ring, covers progressively, and preferably completely, a visible portion of the ring, thus constituting a visual indicator of the mechanical locking of the plug in the receptacle. Thus, the at least partial blanking off of the window guarantees visually to the operator that the locking has been correctly carried out.

According to another advantageous construction mode, the housing of the plug and the housing of the receptacle comprise complementary angular indexing means in order to orient the plug relative to the housing for their coupling and/or their locking. These complementary means can consist of at least one key and at least one groove, which is designed to receive the key by sliding. The key can for example be provided on the outer periphery of the plug housing, and the groove can be provided on the inner periphery of the receptacle housing.

In the mode with the bayonet device and the variant with the resilient return element, in the angular indexing position, before the lug engages in the ramp, it need not be aligned with the input portion thereof, then aligned therewith. This alignment can put the resilient return element under tension, such that it automatically returns the lug to a portion of the ramp in which it is retained. Thereby, the plug and the receptacle are retained together in a pre-coupling configuration.

The subject of the invention is also a circular connector forming a plug, comprising:

- a housing;
- a circular coupling and/or locking ring, fitted such as to be free in rotation around the housing of the plug;
- at least one coupling and locking means arranged on the periphery of the locking ring;
- a mechanical transmission device comprising:
  - a support which is secured on, or is produced integrally with, the housing of the plug, comprising an inner seat, which extends along an axis which is co-linear with, and distinct from, the longitudinal axis;
  - a receipt unit which is secured on, or is produced integrally with, the outer periphery of the ring;
  - a drive unit, which is fitted such as to rotate detachably or permanently in the inner seat of the support, the drive unit being designed to be rotated by a tool, in order to transmit its rotation to the receipt unit, and thereby to the ring.

The subject of the invention is also a process for coupling and/or locking, in their mutual coupling configuration corresponding to a connection, of the plug and the receptacle of the connection assembly as previously described, comprising the following steps:

- i: manual approach of the plug facing the receptacle, preferably with angular indexing between them;
- ii: pre-coupling between the plug and the receptacle;
- iii: insertion of a tool and rotation of the drive unit, in order to transmit its rotation to the receipt unit, and thereby to the ring, until the coupling between the plug and the receptacle is obtained;
- iv: additional rotation of the ring by means of the tool, until a stable locking position is obtained.

Thus, the invention consists substantially of implanting in a cover, around a ring for locking a plug on a receptacle of a connection assembly, a torque transmission device, which is preferably configured as a multiplier in order to de-multiply the forces of a tool on the ring which, by means of a movement of rotation in one direction, from an axis which is offset relative to the central axis, carries out the coupling and/or the locking of the plug on the receptacle.

The unlocking is carried out by rotation of the tool in the inverse direction, until uncoupling takes place. In a mode where the coupling and/or locking device is of the bayonet type with a lug which slides in a ramp, the uncoupling between the plug and the receptacle can also be carried out automatically by a resilient return element, which returns the ring to a position in which the lug is disengaged from the ramp.

The numerous advantages of the invention include the following:

- the possibility of densification of circular connectors on structural or equipment panels as a result of the smaller space occupied by the torque transmission device, the manoeuvres of which are carried out by a tool which is far less cumbersome than a hand of an operator required to carry out the manual locking of the existing circular connection assemblies;
- reliable coupling and locking, which can be obtained by an operator with less effort when the transmission device is configured to de-multiply the forces applied on the tool;
- assisted uncoupling, by putting into place a resilient return element within the cover secured on the housing, thus making it possible to return the locking ring to its initial "ready to be coupled" position;
- implantation of an indicator of correct visual locking, which can easily be produced, and is visible to an operator from the exterior, and in particular from the rear face of the plug;
- the possibility of assistance for the operator with coupling and uncoupling, when the coupling and locking device is of the bayonet type, by prior retention of the plug on the receptacle obtained automatically by the resilient return element, which reduces the risk of dropping the plug, before it actually begins to be coupled on the receptacle secured on a panel.

Other advantages and characteristics of the invention will become more apparent from reading the detailed description of embodiments of the invention, provided by way of non-limiting illustration, with reference to the following figures.

DETAILED DESCRIPTION

In all of the present application, the terms “inner” and “outer” should be understood in relation to a circular connection assembly according to the invention.

For the sake of clarity, a single numerical reference is used for the same element of an electrical connection assembly according to the prior art and an electrical connection assembly according to the invention.

Figure 1:
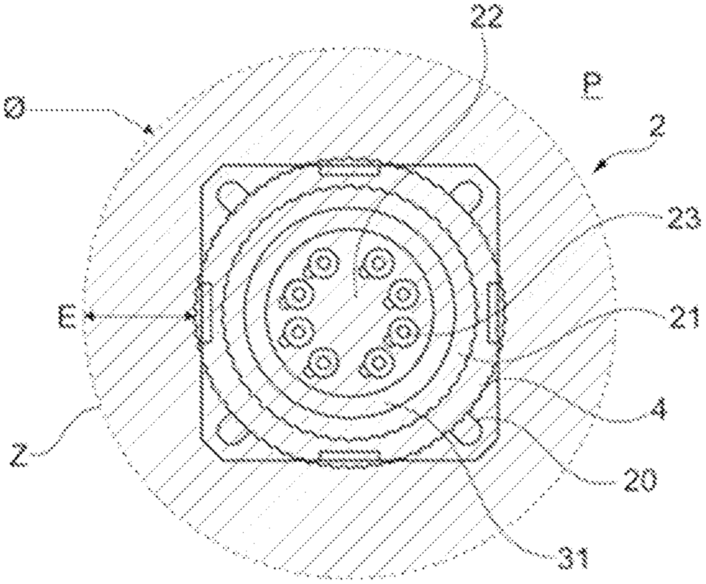
Fig. 1 (PRIOR ART)
FIG. 1 represents in front view a circular connection assembly of a connector of series 38999 according to the prior art, as installed on an electronic equipment panel.

FIG. 1 has already been described in detail in the preamble. It will therefore not be commented on hereinafter.

Figure 2:
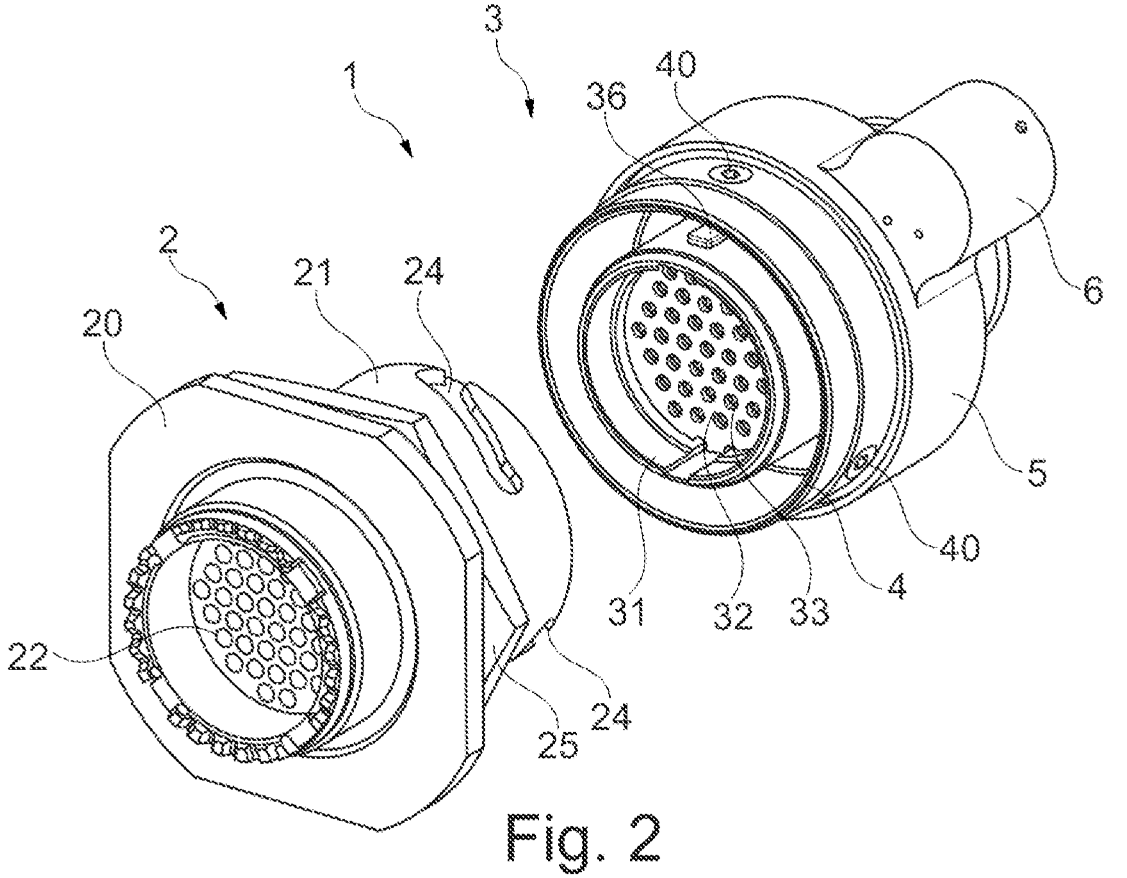
FIG. 2 is a view in perspective of a circular connection assembly according to the invention, with a plug and receptacle facing one another before they are coupled.
Figure 3:
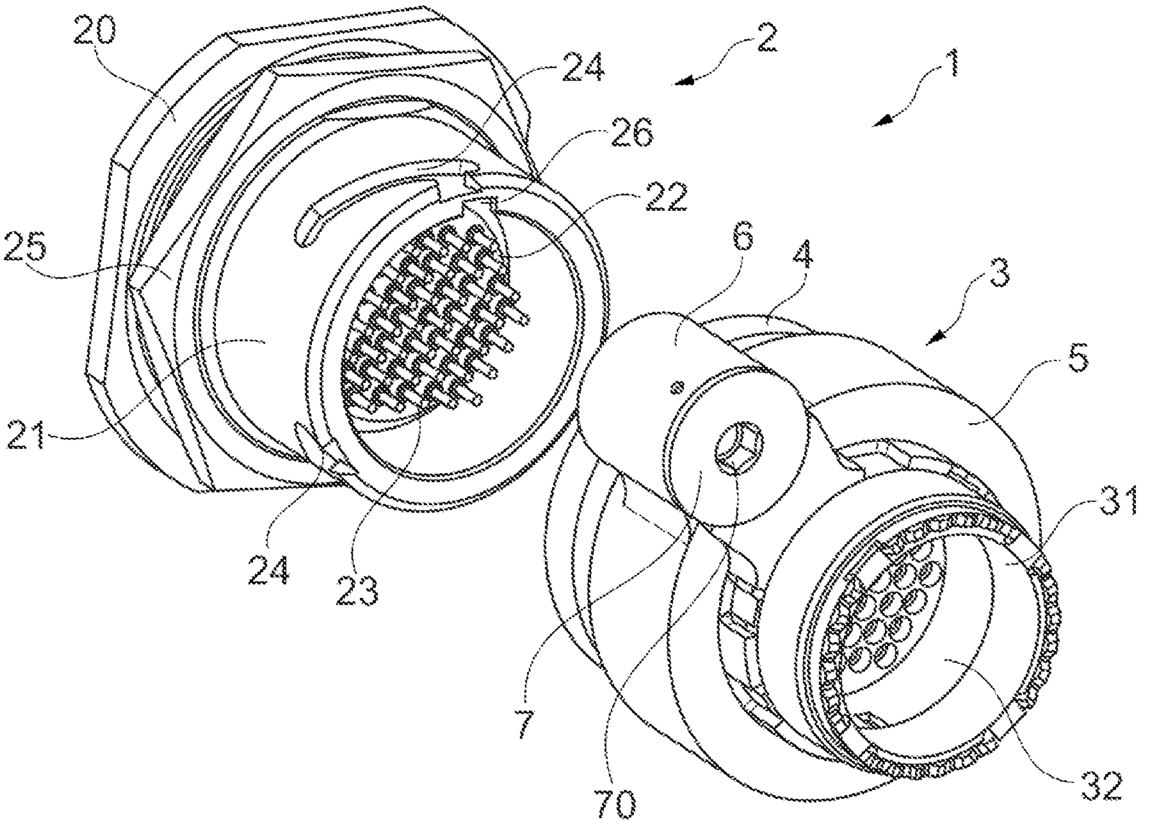
FIG. 3 is another view in perspective of a circular connection assembly according to the invention.

FIGS. 2 and 3 represent a circular connection assembly 1 with a receptacle 2 and a plug 3 to be coupled and locked together along a longitudinal axis X.

The receptacle 2 comprises a plate 20 for securing on an equipment panel P, in particular of an aircraft, a housing 21, which in general is formed integrally with the plate 20, accommodating an insert 22 in which a plurality of electrical contacts 23 are fitted (48 of them in the example illustrated).

The housing 21 of the receptacle 2 comprises on its outer periphery at least one coupling and locking ramp 24, and preferably three of them distributed at 120° from one another, designed to cooperate with a coupling and locking lug 40 explained hereinafter.

The receptacle 2 comprises a nut 25 which is screwed against the plate 20, for securing on an equipment panel P, once it is sandwiched between the plate 20 and the nut 25.

The housing 21 of the receptacle also comprises a longitudinal groove 26 provided in the interior of the housing 21. This groove 26 is a groove for angular indexing of the receptacle 2 with the plug 3, as described hereinafter.

Figure 8:
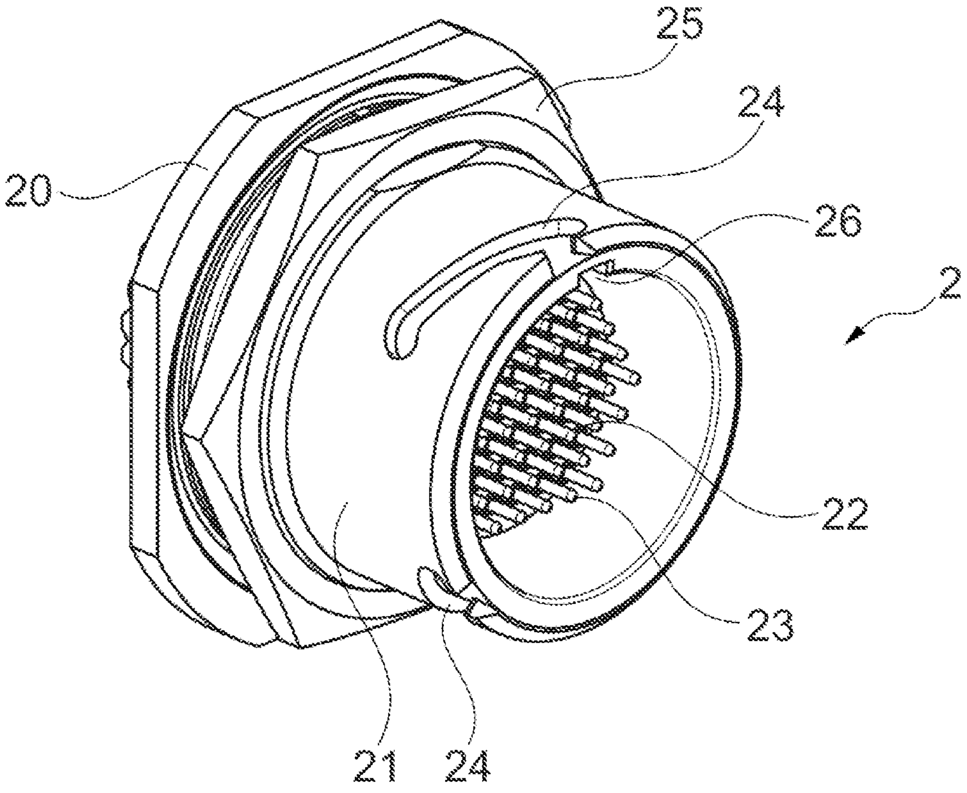
FIG. 8 is a view in perspective of a receptacle according to the invention.
Figure 9:
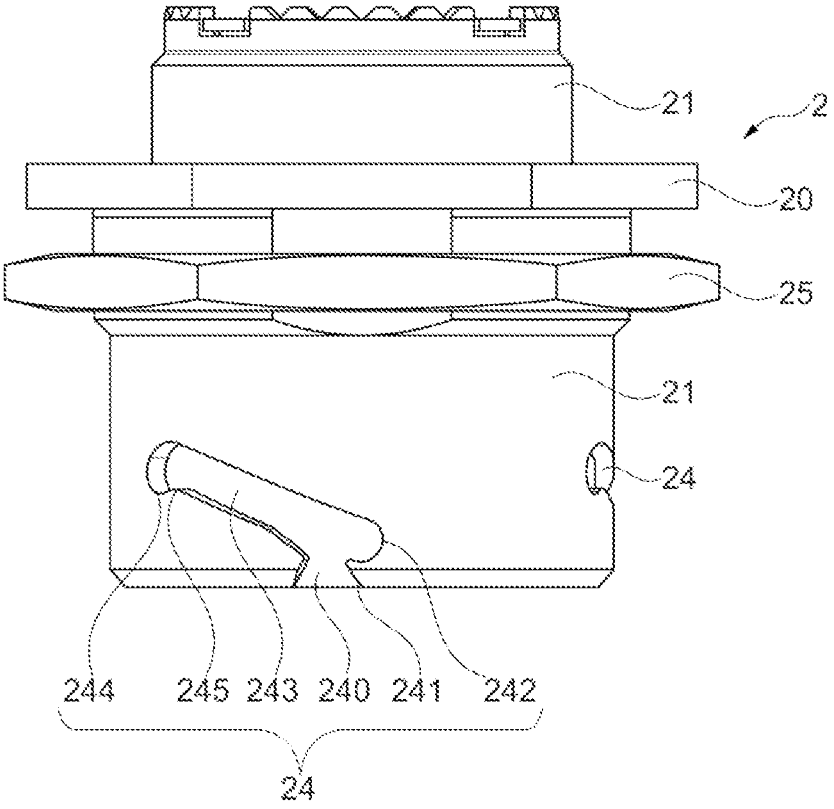
FIG. 9 is a view from above of the receptacle according to FIG. 8.

The receptacle 2 is shown in detail in FIGS. 8 and 9. The coupling and locking ramp 24 comprises a plurality of portions 240 to 245 in the continuity of one another, i.e.:

an input portion 240 in which a lug engages initially;
a chamfer 241 at the end of the input portion;
a pre-coupling portion 242;
a coupling portion 243;
a locking portion 244;
a set-back 245.

The interaction of a locking lug 40 with these different portions 240 to 245 will be described with reference to FIGS. 10A to 10F for the different steps of coupling and locking of a plug 3 in the receptacle 2.

The plug 3 comprises a housing 31 accommodating an insert 32 in which a plurality of electrical contacts 33 are fitted (48 of them in the example illustrated).

The housing 31 of the plug 3 also comprises a longitudinal rib forming a key 36 provided on the exterior of the housing 31. This key 36 is a key for angular indexing of the receptacle 2 with the plug 3, as described hereinafter.

A circular coupling and/or locking ring 4 is fitted such as to be free in rotation around the housing 31 of the plug 3.

At least one compression spring 9, in the form of washers in the example illustrated, is arranged between the housing 31 of the plug 3 and the ring 4, in order to apply pressure of the housing of the plug against the housing of the receptacle, or vice versa, when they are coupled and/or locked together.

Figure 4:
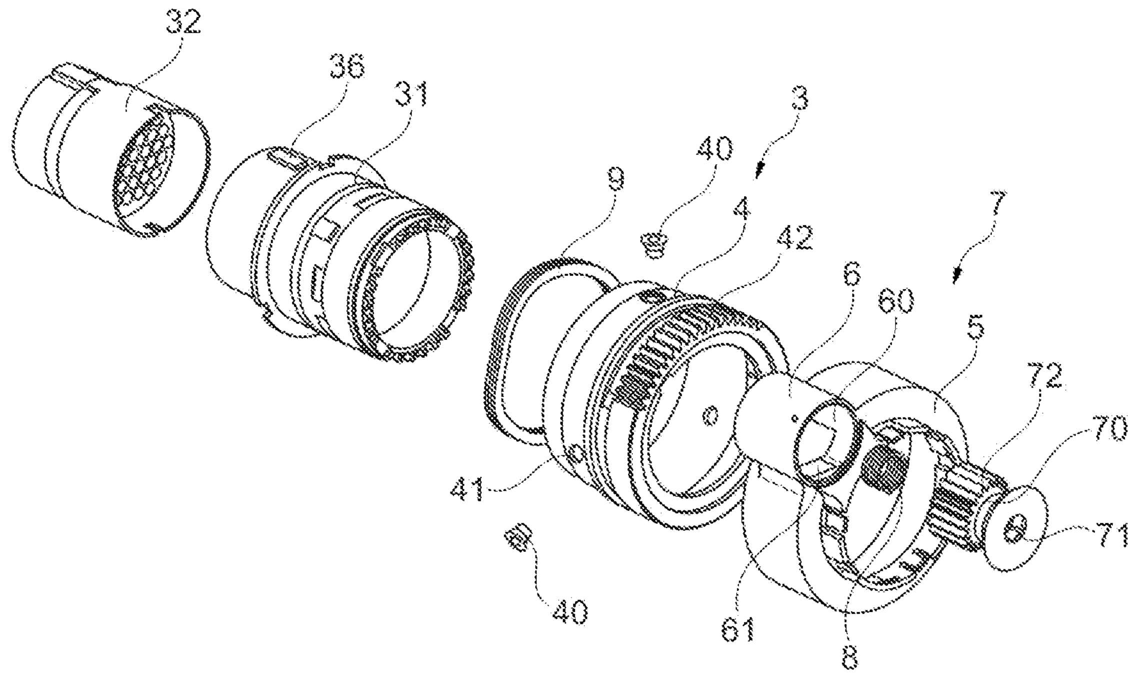
FIG. 4 is an exploded view of the plug of the circular connection assembly according to FIGS. 2 and 3.
Figure 5:
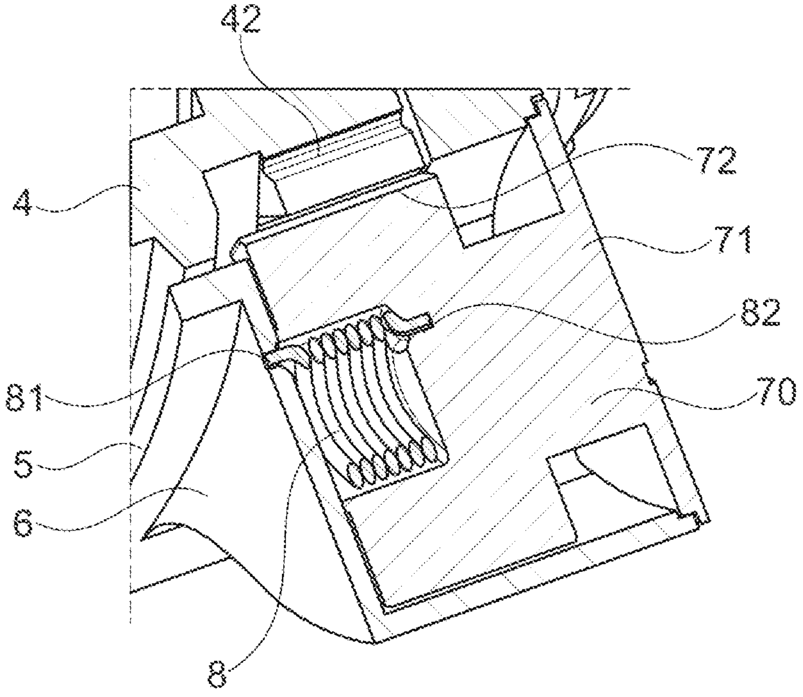
FIG. 5 is a detail view in partial longitudinal cross-section of the plug according to FIG. 4, showing the gear train transmission device according to the invention.

The plug 3, the ring 4, as well as the different components of the torque transmission device according to the invention are shown in detail in FIGS. 4 and 5.

The ring 4 comprises at least one coupling and locking lug 40, and preferably three of them, distributed at 1200 from one another, designed to cooperate with a coupling and locking ramp 24, which is preferably situated on the inner face of the ring 4.

The ring 4 also comprises a toothed outer peripheral portion 42, which is straight in the example illustrated, forming the receipt or output unit of the torque transmission device according to the invention. This toothing could be helical.

A circular cover 5 is fitted around the locking ring 4, and is secured on the housing 31 of the plug 3.

As a support, a hollow circular envelope 6, produced integrally with the cover, delimits an inner seat 60 which extends along an axis (X1) which is co-linear with, and distinct from, the longitudinal axis (X).

A cylindrical gear 7, forming the drive unit of the torque transmission device, is accommodated in the inner seat 60. This cylindrical gear 7 comprises a body 70, an end of which, which is accessible from the exterior, comprises a complementary recess 71 for a tool, and toothing 72 on its periphery which is straight in the example illustrated (or helical). The recess 71 is for example a hollow recess with a plurality of facets, for example six facets, in which a tool with complementary facets can be inserted.

The fitting of the cylindrical gear is shown in detail in FIG. 5.

A torsion spring 8 is arranged in the inner seat 60, with one of its free ends 81 retained therein, and the other one of its free ends 82 retained in the cylindrical gear 7. The functions of this torsion spring 8 are described hereinafter.

As shown in this FIG. 5, the toothing 72 of the cylindrical gear 7 is in direct engagement contact with the toothing of the cylindrical portion of gear 42 of the ring, and taking into account the relative dimensions of these gears 7, 42, the speed of rotation of the gear 42 is slower than the speed of rotation of the gear 7. The gear train which they constitute transmits the rotation torque applied to the gear 7 by a tool to the ring 4, with a de-multiplication ratio of the speeds of rotation of less than 1.

Consequently, the rotation torque applied to the ring 4 is greater than that which an operator applies to the cylindrical gear by means of a tool.

Figure 6:
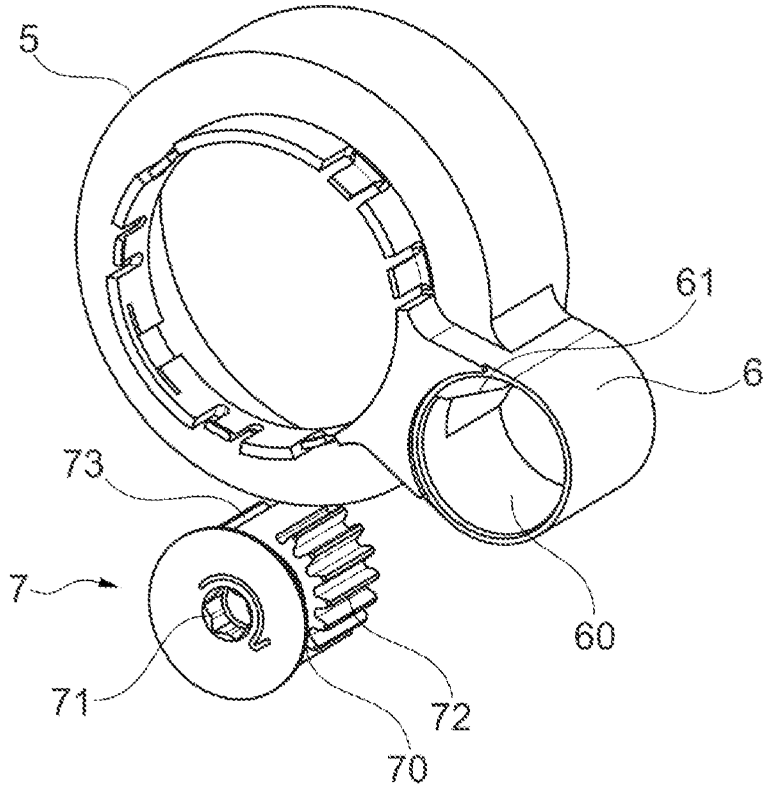
FIG. 6 is a view in perspective showing a cover according to the invention with an offset envelope, in which the gear train input gear is accommodated.

The captive assembly of the cylindrical gear 7 with the spring 8 in the inner seat 60 can be better understood by looking at FIG. 6. The inner seat 60 has a flat part 61, like the cylindrical gear 7 which has a flat part 73 on its outer periphery. Once the alignment between these flat parts 61, 73 has been carried out, the cylindrical gear 7 can be inserted in the inner seat 60.

The torsion spring 8 is pre-stressed by the rotation of the cylindrical gear 7 in the envelope 6, which misaligns the flat parts 61 and 73. The engagement of the toothing 72 on the toothing 42 during the fitting of the subassembly constituted by the cover 5, the envelope 6, the gear 7 and the spring 8, on the ring 4, makes the fitting of the gear 7 in the envelope 6 captive.

Figure 7:
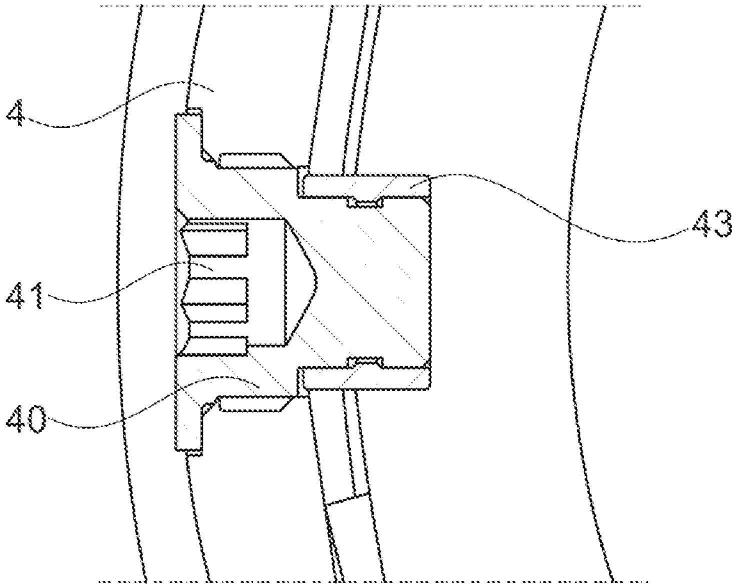
FIG. 7 is a detail view in partial cross-section of a locking ring according to the invention, showing the arrangement of a lug for locking of the bayonet locking device.

FIG. 7 illustrates a variant of fitting and embodiment of a coupling and locking lug 40 according to the invention. Its head comprises a recess 41 which is designed to carry out screwing thereof into a tapped hole provided for this purpose in the ring 4. Advantageously, the lug 40 comprises a roller 43 which is designed to slide with rotation around itself in the ramp 24. This permits sliding with reduced friction.

A description is now provided with reference to FIGS. 10A to 10F and 11, of the steps of coupling and locking between the plug 3 and the receptacle 2 which have just been described, as carried out manually and by means of a tool.

Previously, the receptacle 2 has been secured on an equipment panel by screwing of its nut 25, which sandwiches the said panel between the screwed nut 25 and the securing plate 20.

Figure 10A:
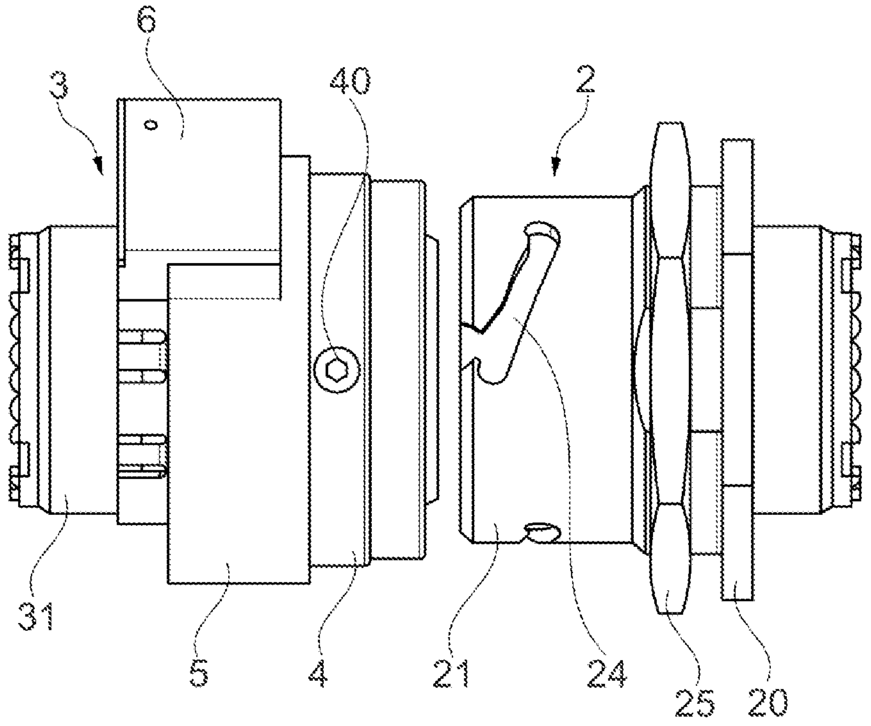
FIGS. 10A to 10F are side and partly sectional views showing the different steps of coupling and locking between the plug and receptacle according to the invention.
Figure 11:
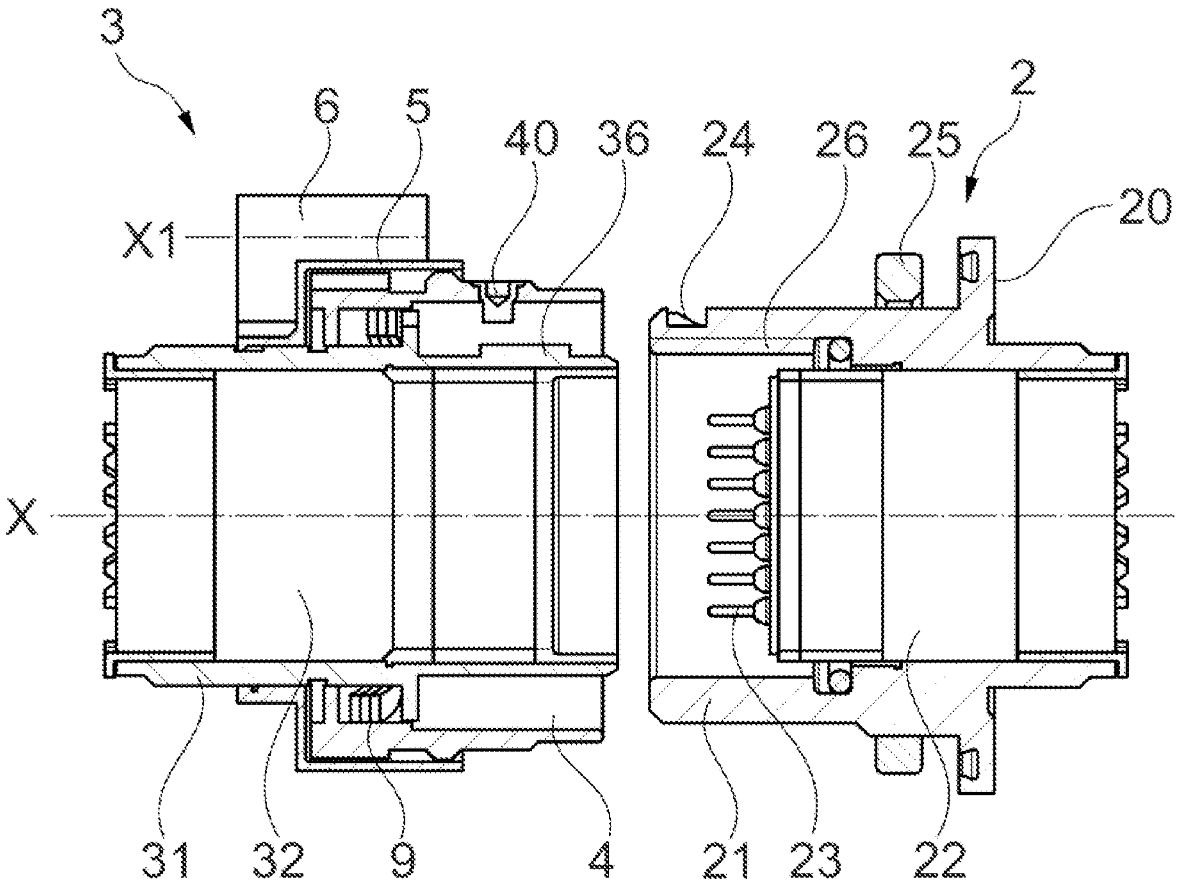
FIG. 11 is a view in longitudinal cross-section corresponding to FIG. 10A for positioning with angular indexing between the plug and the receptacle.

Step i: An operator brings the plug 3 manually towards the receptacle 2, while aligning the angular indexing key 36 with the angular indexing groove 26 (FIGS. 10A, 11).

Figure 10B:
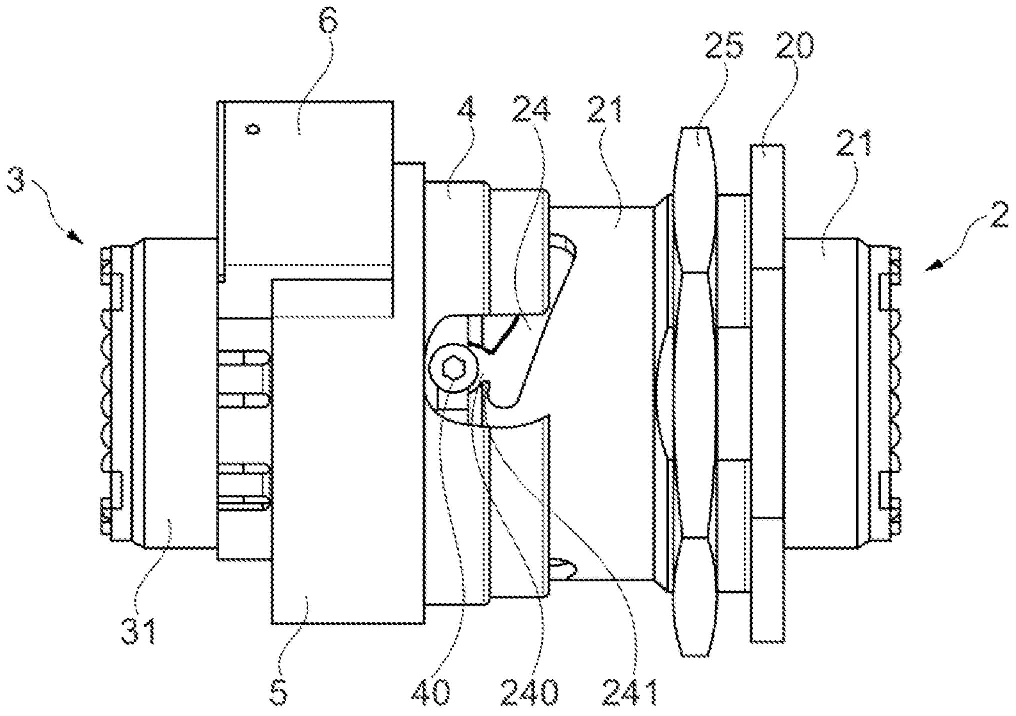

Step ii: During the insertion of the key 36 in the groove 26, pre-coupling takes place between the plug 3 and the receptacle 2. The lug 40 comes into contact with the chamfer 241, which gives rise to rotation of the ring 4 by a few degrees, anticlockwise in the example illustrated, and re-centres the lug 40 in the input portion 240 (FIG. 10B).

The rotation of the ring 4, induced by the re-centring of the lug 40 in the input portion 240, gives rise to an increase in the pre-stress of the torsion spring 8 by means of the gear train 72, 42.

Figure 10C:
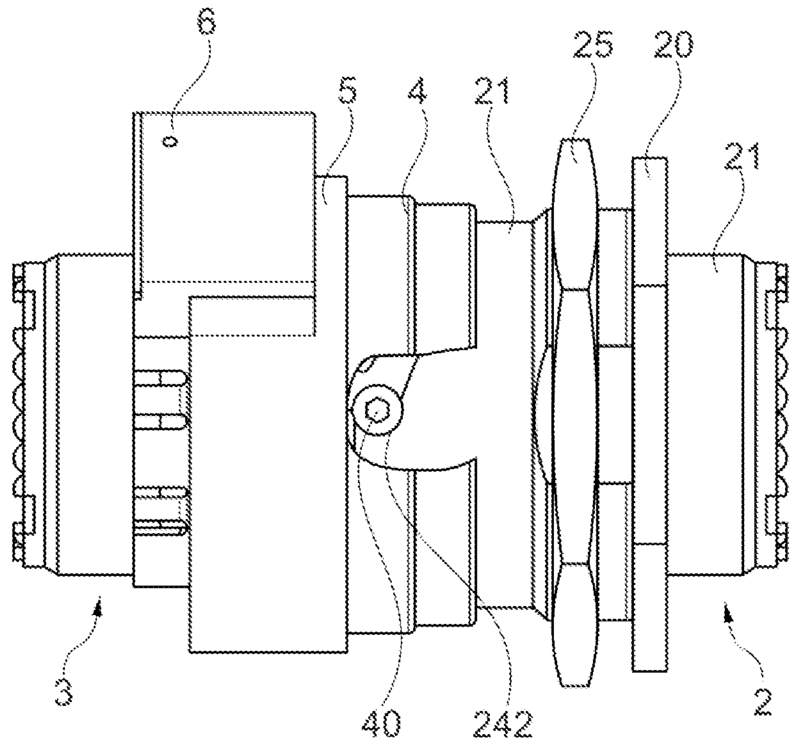

When the lug 40 arrives facing the pre-coupling portion 242, the pre-stressed torsion spring 8 releases its tension at least partly, in order to drive the ring 4 by means of the gear train 72, 42, which brings the lug 40 into the pre-coupling portion 242 of the ramp 24 (FIG. 10C).

Taking into account the form of this pre-coupling portion 242, the lug 40 is thus in a mechanically stable pre-coupling position. In this position, the plug 3 is already retained mechanically on the receptacle 2. This therefore prevents the plug 3 from falling if the operator leaves hold of it.

Step iii: The operator then inserts the rod 11 of a tool 10 in the recess 71 of the cylindrical gear 7. He then rotates the gear clockwise, which, as a result of the direct engagement of the toothing 72, 42, gives rise to rotation of the ring 4 in the anticlockwise direction, with de-multiplication of the rotation torque.

Figure 10D:
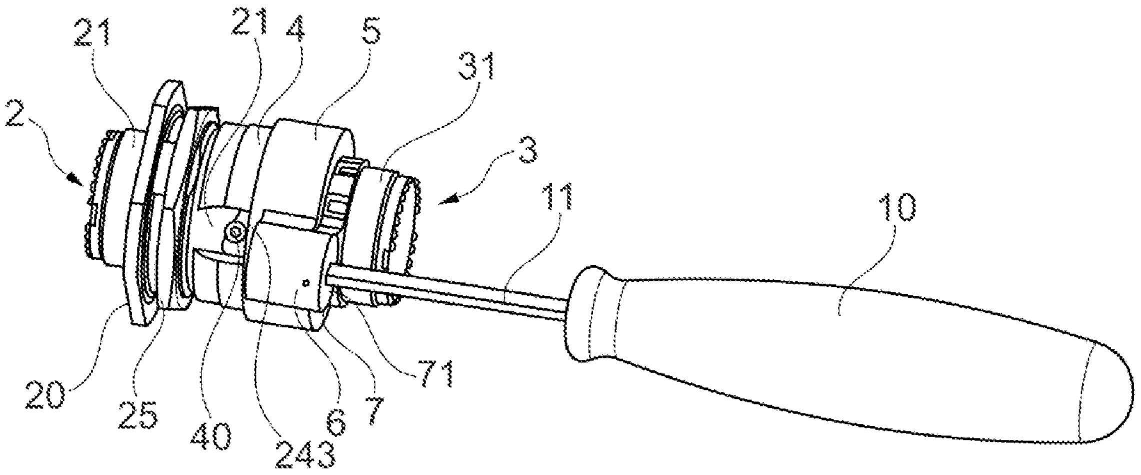
Figure 10E:
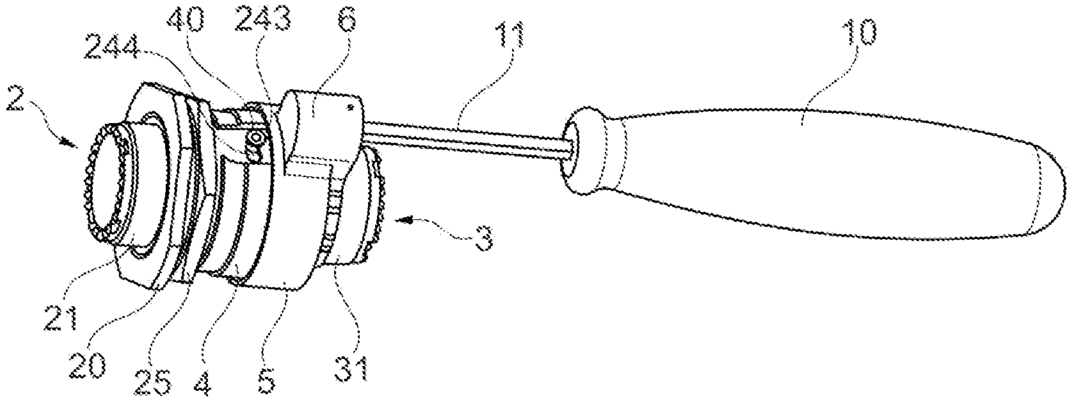

This rotation of the ring 4 gives rise to sliding, in particular by rolling, of the lug 40, from the pre-coupling portion 242 of the ramp 24 to the coupling portion 243 (FIG. 10D).

The rotation of the ring 4 is continued by the operator by means of the tool 10, until the lug 40 reaches the end of the coupling portion 243 (FIG. 10E), at the set-back 245, when the compression of the washers 9 reaches its maximum. The coupling between the plug 3 and the receptacle 2 is then complete.

Figure 10F:
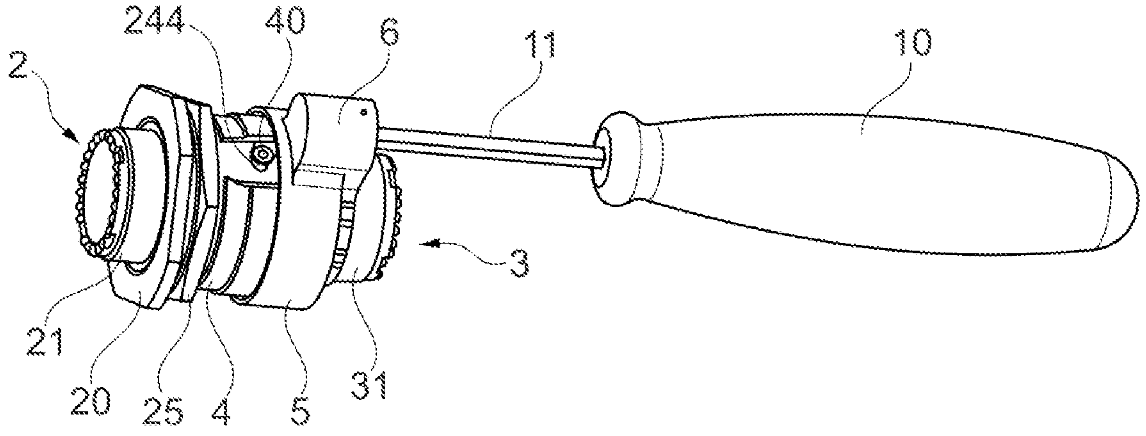

Step iv: As a result of the operator continuing briefly the anticlockwise rotation of the ring 4 by means of the tool 10, the lug 40 is then accommodated in the locking portion 244 of the ramp 24 (FIG. 10F). Because of the set-back 245 of this locking portion 244 in relation to the coupling portion 243, this final locking position of the lug 40 is stable.

Figure 12:
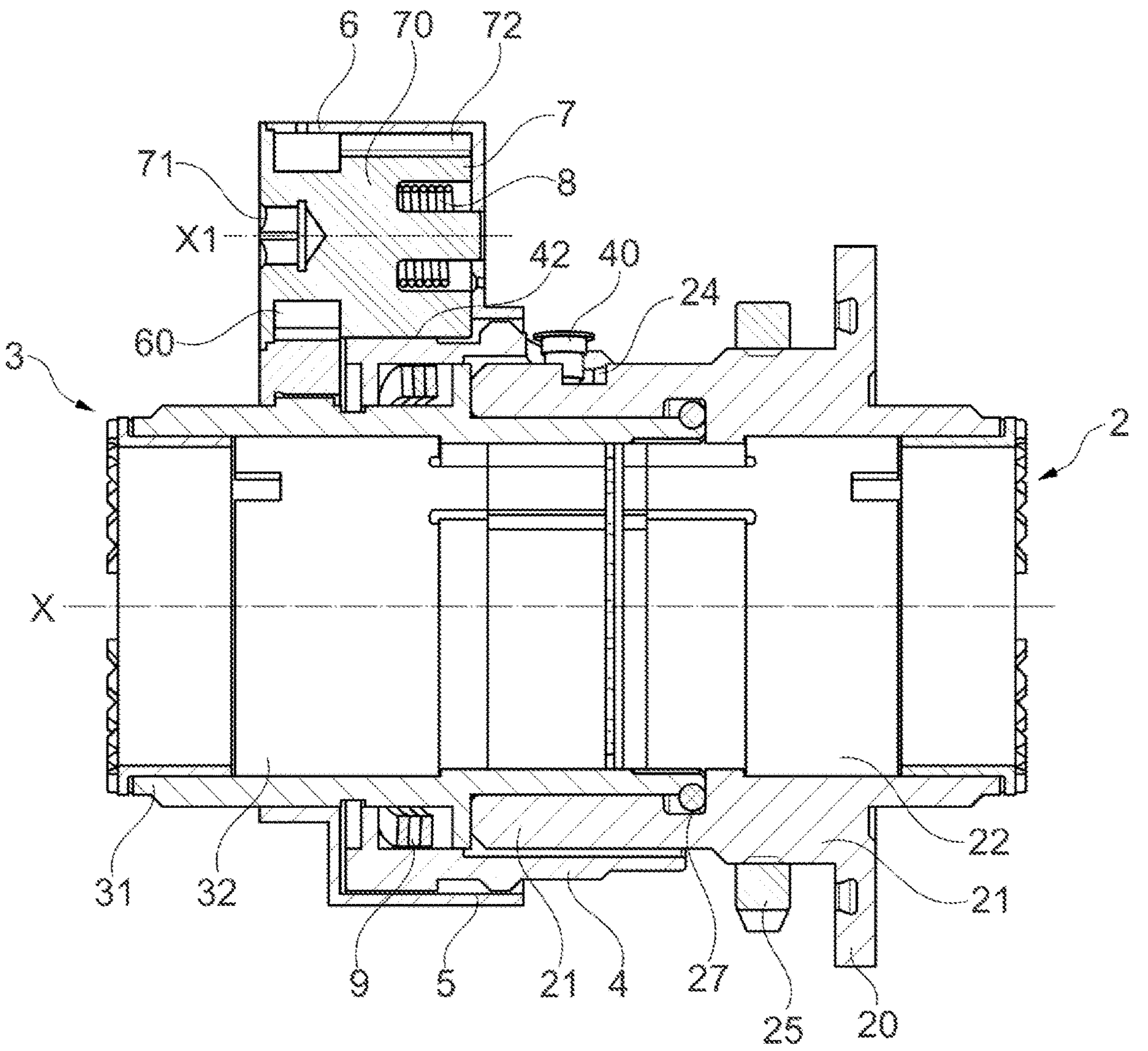
FIG. 12 is a view in longitudinal cross-section of the circular connection assembly, showing the plug and the receptacle in their mutual coupled and locked configuration.

FIG. 12 shows the lug 3 and the receptacle 2 in the configuration in which they are coupled and locked together.

During the steps of rotation of the ring 4, the torsion spring 8 has been put under increasing tension by the rotation of the cylindrical gear 7, from the position of pre-coupling of the lug 40 (FIG. 10C) as far as its coupling position and its locking position (FIG. 10F).

In addition, at the end of the coupling and locking, the compression washers 9 apply a thrust force of the housing 31 of the plug 3 against the housing 21 of the receptacle 2, which guarantees strong, permanent, both electrical and anti-vibration contact pressure of the contacts which are connected in the inserts 22, 32, and between the housings of the plug and the receptacle. Furthermore, a seal 27 which is accommodated in the base of the channel in the interior of the housing 21 of the receptacle 2 is compressed by the thrust of the compression washers 9, which also guarantees the required sealing efficiency.

Figure 13A:
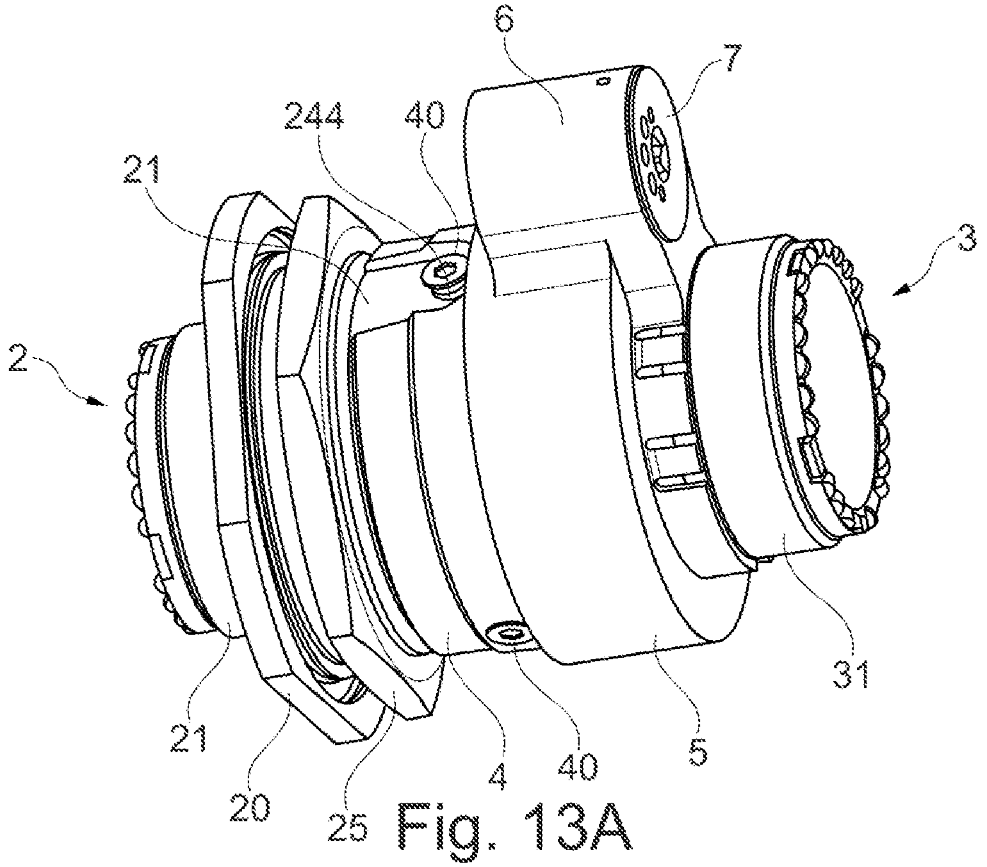
FIGS. 13A et 13B are side and partly sectional views showing the different steps of unlocking and uncoupling and locking between the plug and receptacle according to the invention.
Figure 13B:
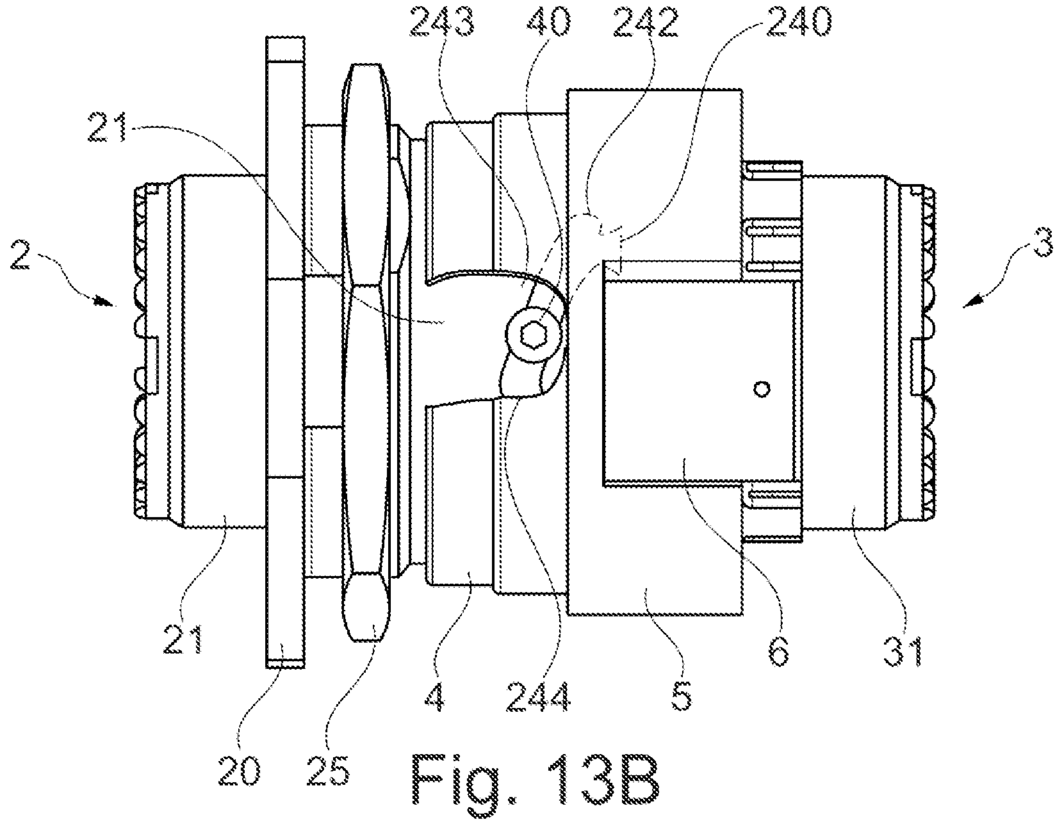

With reference to FIGS. 13A and 13B, a description is now provided of the steps of unlocking and uncoupling between the plug 3 and the receptacle 2, as carried out by means of a tool, then automatically.

Step j: An operator inserts a tool in the recess 71 of the cylindrical gear 7. Then he rotates the gear 7 anticlockwise by means of the tool. As a result of the additional compression of the washers 9 generated by the rotation of the tool, the lug 4 then exits from the portion 244 of ramp 24 corresponding to its stable locking position, passing via the set-back 245, in order to return to the coupling portion 243 of the ramp (FIG. 13A).

Step jj: The relaxation of the torsion spring 8 and of the washers 9 then returns the lug 40 automatically, making it slide along the portion 243 as far as a disengaged position in the input portion 240, or to a pre-coupling position 242 of the ramp 24. The uncoupling between the plug 3 and the receptacle 2 has then been put into effect. During this step jj, the operator does not need to apply any force.

Figure 14:
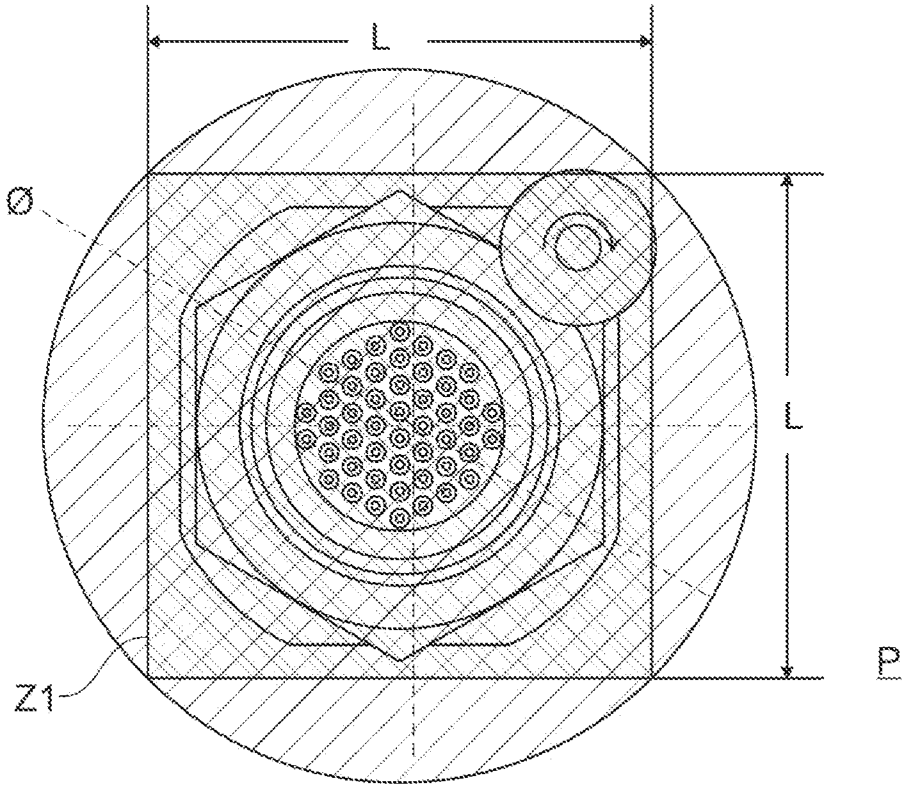
FIG. 14 is a front view of a receptacle according to the invention, as installed on an electronic equipment panel.

FIG. 14 illustrates the increase in the density of the circular connection assembly 1 provided by the invention. In fact, the minimal access area made possible, since it is only for a tool 10, is symbolised by the square hatched area Z1, with a side with a length L, and a surface area equal to L×L, in FIG. 14.

By way of comparison, FIG. 14 also represents the circular surface area with a diameter Ø required to manipulate manually the locking ring of a circular connector according to the prior art, previously illustrated in FIG. 1.

By way of example, for a receptacle 2 with a size 17 comprising 48 contacts, the required surface area per contact is approximately 42 $mm^2$, providing a saving of approximately 20% compared with the prior art, which represents a very significant saving of space on an equipment panel P.

Figure 15:
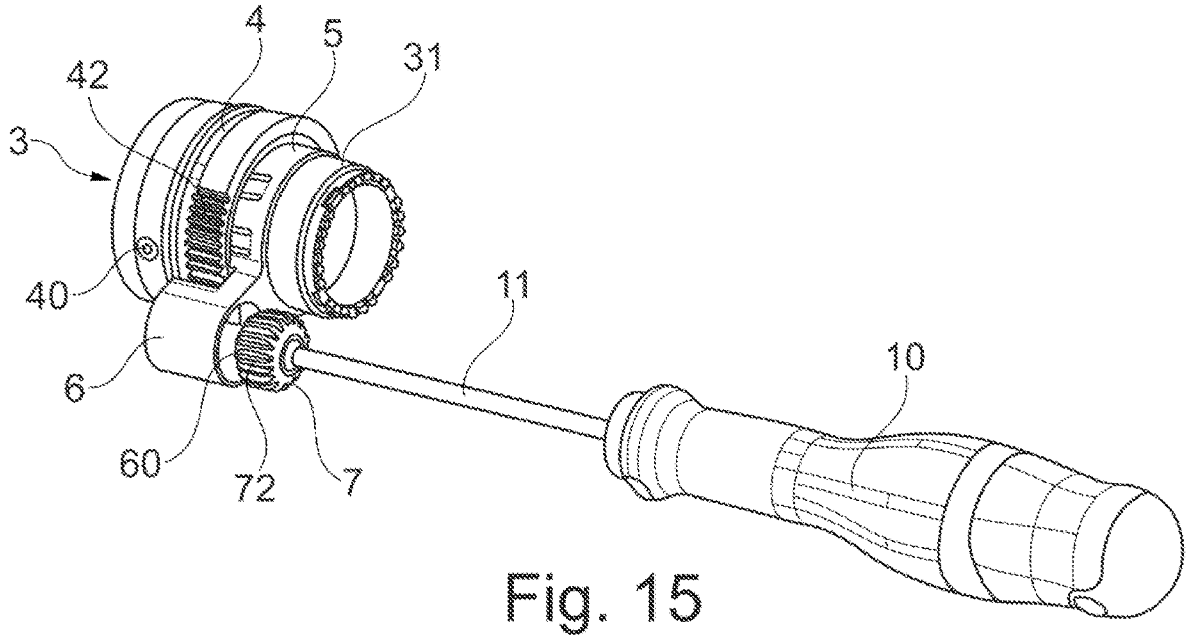
FIG. 15 illustrates in a perspective view a variant embodiment of the cylindrical input gear which is constituted by the free end of a tool, and is thus inserted detachably in its seat.

FIG. 15 illustrates a variant of implantation of the cylindrical gear 70 forming the gear train input gear. In this variant, the cylindrical gear 7 constitutes the free end of the rod 11 of a tool 10 to be inserted detachably in the inner seat 60, so that it comes into direct engagement contact with the circular engagement portion 42 of the ring 4. In this variant, the resilient return element 8 is implanted in the interior of the cover 5, and acts directly on the ring 4.

Figure 16A:
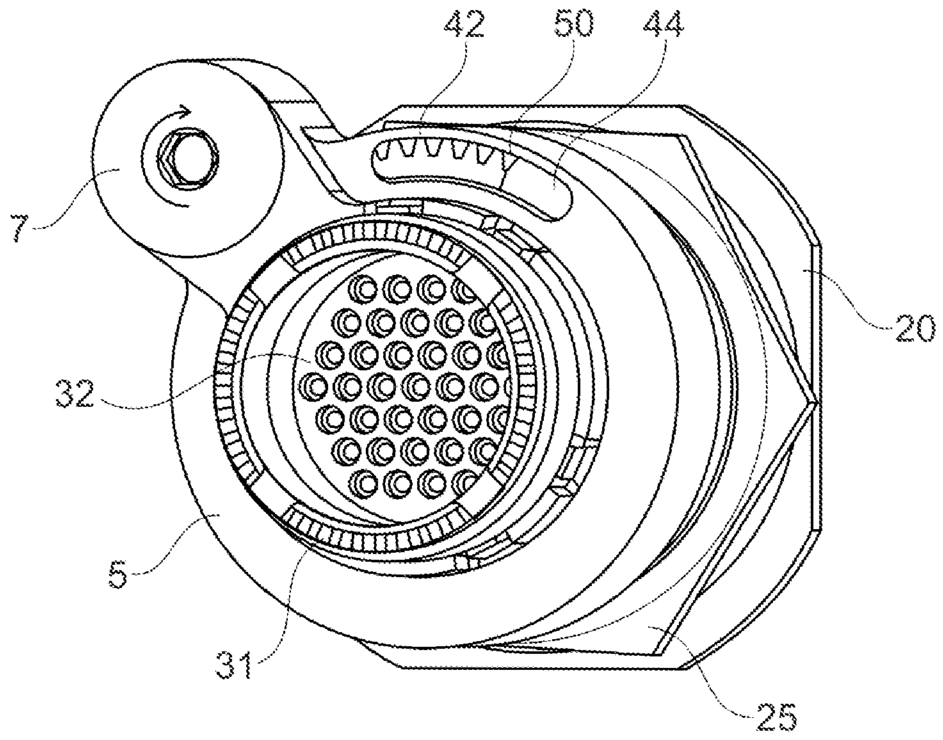
FIGS. 16A and 16B are views in perspective of a plug according to the invention showing the steps of implementation of a visual indicator of locking of the plug on a receptacle according to the invention.
Figure 16B:
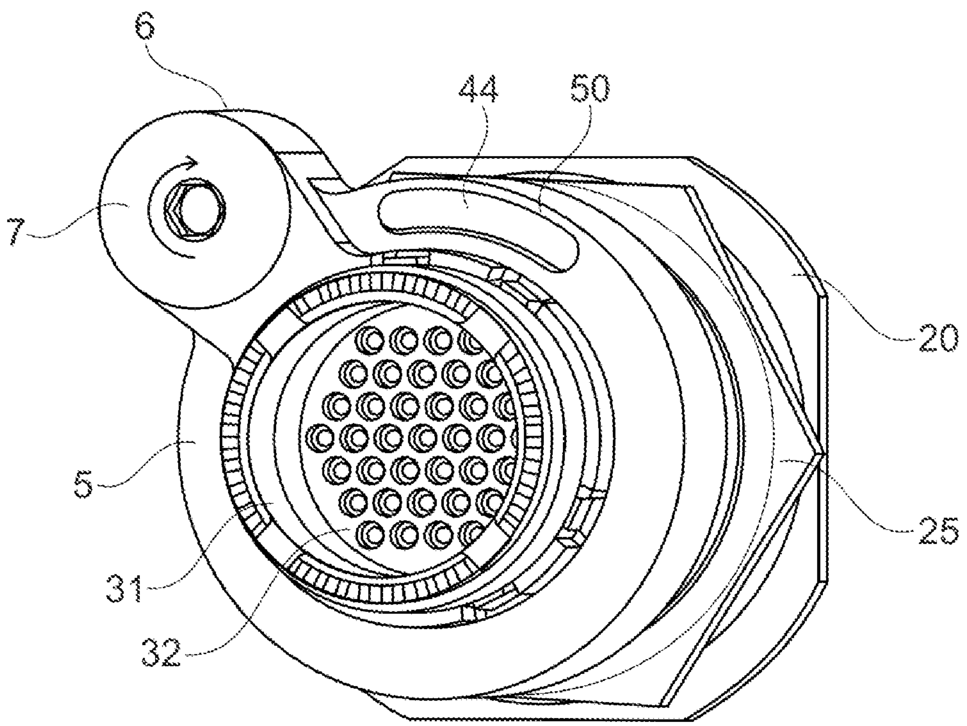

As illustrated in FIGS. 16A and 16B, the cover 5 comprises a window 50 which opens out. A portion of the rear face of the ring 4 can be seen in the window 50 which opens out. This visible portion comprises a visual indicator 44, preferably in the form of marking, indicating that the connection is not locked. As the ring 4 rotates during the coupling and locking operation, the visual indicator 44 is covered by passing below the rear face of the cover 5. When the visual indicator 44 has completely disappeared, only a rear face of the ring 4 without marking is visible, indicating visually to the operator that the connection assembly has effectively been locked.

Other variants and improvements can be provided without departing from the context of the invention.

In the embodiment illustrated, a cover and envelope are provided as a support defining the inner seat of the gear by means of which the rotation torque of the tool is transmitted. A mechanical transmission device can be envisaged which dispenses with these components. For example, a support directly incorporated in the housing can be envisaged, which support is designed to receive a tool for coupling and locking by rotation. This tool can incorporate at its free end the input gear, for example in the form of a toothed wheel designed to slide directly in the support incorporated in the housing, or by means of an intermediate support to be inserted in the support incorporated in the housing.

Although, in the example illustrated, the locking ring 4, the cover 5 and the envelope 6 of the mechanical transmission device are on the plug 3 side, it can also be envisaged to arrange them on the side of a receptacle 2 according to the invention.

The coupling and locking device illustrated is of the bayonet type, with a locking ring bearing one or more lugs each to be engaged and slid in a corresponding ramp of the receptacle. It is also possible to envisage a device for coupling and locking by screwing, with the ring being threaded in its interior, and either the receptacle or the plug which does not bear the ring being threaded externally.

The invention applies not only to circular connection assemblies with a receptacle and plug to be secured on a panel, but also to any other connection assembly not secured on a panel, such as so-called "in-line" connectors, i.e. which are placed and attached on a cable strand.

The invention claimed is:

1. A connection assembly with a longitudinal axis X, comprising:
- a first circular connector forming a receptacle, which in particular is designed to be secured to an electronic or structural equipment panel, and a second circular connector forming a plug, with the receptacle and the plug each comprising a housing;
- a device for coupling and/or locking of the plug and the receptacle in their mutual configuration of coupling, corresponding to a connection, having:
- a circular coupling and/or locking ring, fitted such as to be free in rotation around one out of the housing of the plug and the housing of the receptacle;
- at least one coupling and locking means arranged on the periphery of the locking ring, said means being designed to cooperate with a complementary coupling and locking means arranged on the periphery of one out of the housing of the receptacle and the housing of the plug, such that rotation according to an angular course of the ring makes it possible to couple the plug on the receptacle by translation along the longitudinal axis, then to lock them mechanically when they are coupled to one another;
- a mechanical transmission device having:
- a support which is secured on, or is produced integrally with, one out of the housing of the plug and the housing of the receptacle, comprising an inner seat which extends along an axis which is co-linear with, and distinct from, the longitudinal axis;
- a receipt unit which is secured on, or is produced integrally with, the outer periphery of the ring; and
- a drive unit, which is fitted such as to rotate detachably or permanently in the inner seat of the support, the drive unit being designed to be rotated by a tool, in order to transmit its rotation to the receipt unit and thereby to the ring.

2. The connection assembly according to claim 1, wherein the mechanical transmission device further comprises:
- a circular cover which is fitted around the locking ring, and is secured on one out of the housing of the plug and the housing of the receptacle; and
- as a support, a hollow envelope which is secured on, or produced integrally with, the cover, delimiting the inner seat.

3. The connection assembly according to claim 1, wherein the ring is fitted around the housing of the plug.

4. The connection assembly according to claim 1, wherein a de-multiplication ratio, of the speeds of rotation, between the receipt unit and the drive unit, is less than 1, such that the transmission device increases the rotation torque applied by the drive unit to the ring.

5. The connection assembly according to claim 1, wherein the mechanical transmission device comprising a gear train, includes, as a drive unit, at least one cylindrical gear which is fitted such as to rotate, detachably, or permanently, in the inner seat, as a receipt unit, a circular engagement portion which is secured on, or is produced integrally with, at least part of the outer periphery of the ring.

6. The connection assembly according to claim 5, with the cylindrical gear constituting a free end of the tool to be inserted detachably in the inner seat, and preferably while being in direct engagement contact with the circular engagement portion.

7. The connection assembly according to claim 5, wherein the cylindrical gear is fitted such as to rotate permanently in the inner seat, preferably while being in direct engagement contact with the circular engagement portion.

8. The connection assembly according to claim 1, wherein the coupling and/or locking device is of the bayonet type and comprises:
- at least one coupling and locking ramp arranged on the outer periphery of the housing of one out of the receptacle and the plug; and
- at least one coupling and locking lug arranged on the inner periphery of the ring, and designed to engage in the said at least one ramp, and slide therein from a pre-coupling position reached by relative translation between the plug and the receptacle without action by the tool, to a coupling position, in which the plug and the receptacle are coupled to one another by means of rotation of the drive unit by the tool, and a locking position in the continuity of the coupling position, obtained by additional rotation, wherein the plug and the coupled receptacle are locked mechanically.

9. The connection assembly according to claim 8, wherein the lug comprises a roller which is designed to slide with rotation around itself in the ramp.

10. The connection assembly according to claim 8, comprising a resilient return element to rotate the ring automatically once the lug is engaged in the ramp, and bring the lug into the pre-coupling position, in which the lug cannot be released without the action of the tool.

11. The connection assembly according to claim 10, wherein the resilient return element is also put under increasing tension by the rotation of the drive unit from the pre-coupling position of the lug, to its coupling position and its locking position, such that inverse rotation of the drive unit by the tool returns the lug from its locking position to its coupling position, which unlocks the plug from the receptacle, with the relaxation of the resilient return element returning the lug automatically to a pre-coupling or disengaged position of the ramp, which uncouples the plug from the receptacle.

12. The connection assembly according to claim 10, wherein the resilient return element is a torsion spring which is arranged in the inner seat, with one of its free ends retained therein, and the other one of its free ends retained in the cylindrical gear.

13. The connection assembly according to claim 1, comprising at least one compression spring which is arranged between one out of the housing of the plug and the housing of the receptacle and the ring, in order to apply pressure of the housing of the plug against the housing of the receptacle, or vice versa, when they are coupled and/or locked together.

14. The connection assembly according to claim 2, wherein the cover comprises a window which opens out, which, during the rotation of the ring, covers progressively a visible portion of the ring, thus constituting a visual indicator of the mechanical locking of the plug in the receptacle.

15. A process for coupling and/or locking, in their mutual coupling configuration corresponding to a connection, of a plug and a receptacle of the connection assembly according to claim 1, comprising the following steps:

i: manual approach of the plug facing the receptacle;

ii: pre-coupling between the plug and the receptacle;

iii: insertion of a tool and rotation of the drive unit, in order to transmit its rotation to the receipt unit, and thereby to the ring, until the coupling between the plug and the receptacle is obtained; and iv: additional rotation of the ring by means of the tool, until a stable locking position is obtained.

16. A circular connector forming a plug, comprising:

a housing;

a circular coupling and/or locking ring fitted such as to be free in rotation around the housing of the plug;

at least one coupling and locking means arranged on the periphery of the locking ring;

a mechanical transmission device comprising:

a support which is secured on, or is produced integrally with, the housing of the plug, comprising an inner seat, which extends along an axis which is co-linear with, and distinct from, the longitudinal axis of the plug;

a receipt unit which is secured on, or is produced integrally with, the outer periphery of the ring;

a drive unit, which is fitted such as to rotate detachably or permanently in the inner seat of the support, the drive unit being designed to be rotated by a tool, in order to transmit its rotation to the receipt unit, and thereby to the ring.

* * * * *